United States Patent [19]

Ambrose et al.

[11] Patent Number: 4,543,405

[45] Date of Patent: Sep. 24, 1985

[54] HIGH SOLIDS POLYURETHANE POLYOLS AND COATING COMPOSITIONS THEREOF

[75] Inventors: Ronald R. Ambrose, Allison Park; Wen-Hsuan Chang; David T. McKeough, both of Gibsonia; John R. Peffer, Pittsburgh, all of Pa.

[73] Assignee: PPG Industries, Inc., Pittsburgh, Pa.

[21] Appl. No.: 656,559

[22] Filed: Oct. 1, 1984

[51] Int. Cl.[4] ............................................ C08G 18/32
[52] U.S. Cl. ...................................... 528/78; 252/182; 524/761; 524/762; 524/765; 528/85; 528/369
[58] Field of Search .......................... 528/78, 85, 369; 252/182; 524/761, 762, 765

[56] References Cited

U.S. PATENT DOCUMENTS 3,248,373 4/1966 Barringer ............................... 528/85
4,288,577 9/1981 McShane ............................... 528/85

Primary Examiner—Maurice J. Welsh
Attorney, Agent, or Firm—Godfried R. Akorli

[57] ABSTRACT

There are disclosed herein polyurethane polyols and coating compositions formulated therewith. The polyurethane polyols are prepared by typically reacting low molecular weight polyols in amounts sufficient to produce reaction products containing a significant amount of unreacted starting polyols which can be subsequently removed by means such as vacuum distillation.

20 Claims, No Drawings

HIGH SOLIDS POLYURETHANE POLYOLS AND COATING COMPOSITIONS THEREOF

BACKGROUND OF THE INVENTION

1. Field of the Invention

The present invention relates to resinous polyols which are particularly useful in high solids coating compositions. More specifically, the present invention relates to resinous polyols comprising high solids polyurethane polyols which are prepared by reacting low molecular weight polyols with polyisocyanates, wherein the reaction product is characterized by the presence of a significant amount of unreacted starting polyols.

2. Brief Description of the Prior Art

In preparing resinous polyols, particularly low molecular weight ones, the full implications of using a large excess of starting low molecular weight simple polyols such as glycols had not been appreciated in the art. Certainly, the significance of using a large excess of starting polyols generally, followed by removing the attendant unreacted starting polyols from reaction products had not been appreciated in the art. Specifically, it had not been appreciated that by removing unreacted starting polyols, performance properties of coating compositions comprising the resultant resinous polyol could be affected significantly.

In the prior art preparation of low molecular weight resinous polyols, there are employed controlled amounts of starting polyols. The amounts of starting polyols are controlled in such a manner as would produce resinous polyols containing tolerable amounts of unreacted starting polyols. Usually, the unreacted starting polyols in these amounts, i.e., up to about 5 percent, are not intentionally removed from the reaction product.

In preparing art-known low molecular weight polyurethane polyols, commonly, "oligomeric polyols" such as polyester polyols are reacted with isocyanates. Generally, these reactions do not entail removal of unreacted starting polyols.

In the present invention, simple polyols can be employed in relatively large excess with the intent of substantially increasing the low molecular weight and the narrow molecular weight distribution of the resultant resinous polyols. While the reaction is attended by a significant amount of unreacted polyol, a portion or all of the unreacted polyol can be subsequently removed from the reaction product. Thus, the narrow molecular weight distribution of the resinous polyol is optimized.

SUMMARY OF THE INVENTION

The present invention encompasses a polyurethane polyol having a number average molecular weight of up to about 1000 which is prepared by reacting a low molecular weight starting polyol with a polyisocyanate wherein the starting polyol is in an amount sufficient to produce a reaction product containing a significantly high amount, i.e., about 16 percent by weight or higher and preferably about 21 percent or higher of unreacted starting polyol. The percent by weight is based on weight of the reaction product. The low molecular weight starting polyols useful herein are simple polyols which are distinguishable from polymeric polyols.

The invention further encompasses a polyurethane polyol having a low number average molecular weight of up to about 1000 which is prepared by reacting a low molecular weight starting polyol with a polyisocyanate, wherein the starting polyol is in an amount sufficient to produce a reaction product containing a significant amount, i.e., about 5 percent by weight of unreacted starting polyol. The percent by weight is based on the weight of the reaction product. Integrally, this is followed by removing about 30 percent by weight or higher of the unreacted starting polyol from the reaction product under essentially non-reacting conditions. The percent by weight, here, is based on the weight of the unreacted starting polyol. Removal of the unreacted starting polyol can be effected by physical means such as distillation which is preferred, or by alternate means such as crystallization or extraction.

In specific embodiments, the present invention encompasses a polyurethane polyol having a number average molecular weight of up to about 1000 which is prepared by reacting a diol with a diisocyanate, wherein the starting diol is employed in an amount sufficient to produce a reaction product containing about 5 percent or higher and preferably about 15 percent or higher of the unreacted starting diol. This is followed by removing about 30 percent by weight or higher of the unreacted starting polyol, under essentially non-reacting conditions.

The polyurethane polyol can be further reacted with an acid, an anhydride, a lactone, an isocyanate or the like to form resinous polyols of varying molecular weight. The further reaction can be conducted before or after the removal of the unreacted starting polyol. The resultant product will be different depending on whether the further reaction is before or after the removal of the unreacted starting polyol.

In the practice of this invention, coating compositions can be formulated with the above polyurethane polyol or resinous polyol thereof, in combination with curing agents such as aminoplasts, phenoplasts and polyisocyanates. The coating compositions can be of a high solids type. They can have sprayability at a solids content of at least 40 percent or higher. As such, the coating compositions of this invention can be of relatively low volatile organic content (VOC). In this context, the terms molecular weight, solids content, sprayability and volatile organic content (VOC) are defined as follows.

The molecular weight refers to a number average molecular weight as determined by gel permeation chromatography (GPC) using a glycol standard. Therefore, it is not the actual number average molecular weight which is measured but a number average molecular weight which is relative to the glycol standard. The number average molecular weight herein excludes contributions by unreacted starting polyols.

The solids (i.e., the non-volatile) content of the resinous polyol is determined by ASTM D-2369 testing modified as follows: 0.5 grams of the resinous polyol (i.e., the reaction mixture which may comprise unreacted polyol) is mixed with 5 milliliters of 1:1 mixture of acetone and tetrahydrofuran and heated at 105° C. for 2 hours in a forced draft oven. The resinous polyol is then cooled in a desiccator, reweighed and the non-volatile content calculated. The percentage by weight of the resinous polyol remaining is reckoned as the solids content. By this method, unreacted starting polyol is usually volatile is not included in the determined solids.

The term "sprayability" means the maximum concentration of solids at which the coating composition can be atomized sufficiently to form a uniformly deposited coating, under normal spraying conditions of, say, temperature, pressure, and spray equipment design such as entails the use of an air suction gun operating at 60 psi with a No. 30 air cap. This maximum concentration is solvent dependent and usually occurs in a viscosity range of 20 to 24 and preferably at about 22 seconds with a No. 4 Ford cup at room temperature after thinning with a solvent such as a mixture of methyl amyl ketone and ethoxyethyl acetate. Above this maximum concentration, appearance as manifested by leveling and solvent popping typically becomes unacceptable.

The VOC is defined as any weight per volume of compound of carbon which evaporates from a paint or related coating material under the specific conditions for the determination of the non-volatile content of that material. This does not include water which is volatile under the test conditions. Thus, the water content of the material undergoing analysis must be determined. To obtain the VOC of a sample, the non-volatile content, water content and the density of the material are determined. The VOC number is calculated by correcting the total organic volatile content for the water content and dividing by the volume of the paint corrected for the water content. The determination of the VOC is by ASTM D-3960 testing which entails heating the paint or related coating material at 110° C. for 1 hour.

In this text, the term "significant amount" refers to any amount which is equal to or more than that which would have been presumed to be tolerable in the art-known high solids resinous polyols. Heretofore, amounts of unreacted starting polyol in excess of the tolerable amounts would have been considered detrimental because of associate negatives which are discussed hereinafter. The term "significantly high amount" is used, in distinction, to denote that which is substantially more than the presumed tolerable amount. An estimate of the unreacted starting polyol can be obtained from the resin solids content of the polyester polyol. Alternately, an estimate of the unreacted starting polyol can be obtained by GPC.

The GPC estimate of the glycol content may be obtained using the area of the glycol peak in relation to the total area under all components of the chromatogram.

$$\text{Percent glycol} = \left( \frac{\text{Area of glycol peak}}{\text{Sum of the areas of all the peaks}} \right) \times 100$$

The percent glycol calculated is based on the assumption that the detector gives the same weight to area response for all components.

DETAILED DESCRIPTION OF THE INVENTION

The claimed invention encompasses in one aspect, polyurethane polyols containing "significantly high" amounts, i.e., about 16 percent or higher and preferably 21 percent or higher of unreacted starting polyols wherein the unreacted starting polyols are not removed. As fully explained hereinafter, these polyurethane polyols are advantaged by the preponderance of low molecular weight and narrow molecular weight distribution of the polyurethane polyol species. They can have utility as intermediates for the preparation of other resinous materials, and they can have utility in their own right as film-formers.

In the other aspect, the present invention encompasses polyurethane polyols containing a "significant amount", i.e., about 5 percent or higher, typically about 10 percent or higher and preferably about 15 percent or higher of starting polyol which is removed in part or in all. These polyurethane polyols are of optimized low number average molecular weight and narrow molecular weight distribution.

These polyurethane polyols can be formulated into coating compositions of high sprayability and low VOC. Surprisingly, it has been found when the unreacted starting polyols are removed, there can be improvement in performance properties such as hardness of coating compositions comprising the polyurethane polyols.

The preparation of the polyurethane polyols of this invention involve, generally, condensation reaction. The distribution of species in the resultant product is illustrated by Flory's theory which is known to those in the art. In accordance with the Flory equation, when a glycol A condenses with a diisocyanate B to form a reaction product comprising a polyurethane polyol, there is obtained a distribution of species which may be described as follows:

$$nA + mB \rightleftharpoons A_1 + B_1 + A_1B_1 + A_2B_1 + A_1B_2 + A_2B_2 + A_3B_2 + \ldots \quad (1)$$

where A and B denote a starting glycol and diisocyanate, respectively, n and m are the number of moles of A and B charged, and the subscripts denote the number of A and B units in a particular species. If the reaction is carried out with excess glycol ($n > m$) and the reaction is carried out to completion (—NCO equivalent weight of infinity), the species which contain —NCO functional groups become negligible, and equation (1) simplifies to:

$$nA + mB \rightleftharpoons A_1 + A_2B_1 + A_3B_2 + A_4B_3 + A_5B_4 \ldots \quad (2)$$

The mole fraction distribution, F(r), and the weight fraction distribution, W(r), of the polyurethane glycol can be calculated as follows:

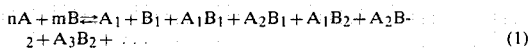

$$F(r)_{A_{r+1}B_r} = (1 - \beta)\beta^r \quad (3)$$

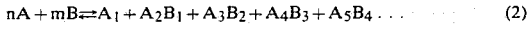

$$W(r)_{A_{r+1}B_r} = \frac{F(r)_{A_{r+1}B_r} MW_{A_{r+1}B_r}}{\sum_{r=0}^{\infty} F(r)_{A_{r+1}B_r} MW_{A_{r+1}B_r}} \quad (4)$$

where $\beta$ is the extent of reaction of hydroxyl groups and this is m/n when the reaction is carried to completion, i.e., to the —NCO equivalent weight of infinity, r is the number of diisocyanate species, i.e., B units per molecule, and MW is the molecular weight of the $A_{r+1}B_r$ species. As would be realized, the species such as $A_2B_1$ and to some extent $A_3B_2$ which are low molecular weight species are more desirable for high solids compositions.

To obtain these polyurethane polyols, it would have been theorized that one would have to employ relatively higher quantities of starting polyols. This theory would have had a limited practical use because the high quantities of starting polyols would result in correspondingly high quantities of unreacted starting polyols which are believed to have the following associate negatives. The unreacted starting polyols which are in the nature $A_1$ are of relatively lower molecular weight. Hence, they may volatilize during heat curing of coatings containing same. When cured into coatings with curing agents such as melamines, they may impart brittleness to the coating.

In view of the above negatives, it would seem that in preparing low molecular weight resinous polyols for coatings with low VOC, there is a point of diminishing returns beyond which the use of still higher quantities of starting polyols either produces no change in VOC or causes an increase in VOC. Apparently, at this prohibitive point, there are present intolerable amounts of unreacted starting polyols.

The present invention exceeds the prohibitive point of the prior art. In accordance with this invention, polyurethane polyols contain "significant" or "significantly high" amounts of unreacted starting polyols. The polyurethane polyols are characterized by a preponderance of low molecular weight and narrow molecular weight distribution of the polyurethane polyol species. When the unreacted starting polyols are removed, the polyurethane polyols are further characterized by optimized narrow molecular weight distribution.

This aspect of the invention is demonstrated below by the preparation of high solids polyurethane polyols. The preparations entail the reactions of a diol of molecular weight of 118 with a diisocyanate of molecular weight of 210, in different mole ratios to 100 percent extent of reaction. The weight percent of species can be calculated from the Flory equations. The calculated results are shown below.

TABLE I

| Mole Ratio Diol/NCO | Weight Percent of Unreacted Diol $A_1$ | Weight Percent of Desired Low Molecular Weight Species $A_2B_1$ | Weight Percent of Higher Molecular Weight Species $A_3B_2 + \ldots$ |
|---|---|---|---|
| (i) 1.5:1 | 5.3 | 13.4 | 81.3 |
| (ii) 1.7:1 | 8.7 | 19.4 | 71.9 |
| (iii) 2.0:1 | 13.9 | 26.3 | 59.8 |
| (iv) 2.3:1 | 18.8 | 30.9 | 50.3 |
| (v) 3.0:1 | 28.7 | 36.2 | 35.1 |
| (vi) 4.0:1 | 40.0 | 37.8 | 22.2 |

As can be seen from Table I, more of the $A_2B_1$ species, and less of $A_3B_2$ and higher species are obtained with increase in the amount of unreacted starting diols.

In accordance with this invention, all or part of the unreacted starting diol can be subsequently removed. With the unreacted starting diol removed, the polyurethane polyol contains significantly higher proportions of the desired low molecular weight $A_2B_1$ species as shown by the above table. The resultant polyurethane polyol is of low molecular weight and narrow molecular weight distribution.

In accordance with this invention, the unreacted starting polyol is removed in an amount sufficient to give the desired resin solids content and performance properties in cured films. Typically, at least 30 percent and preferably from about 60 percent or higher of the unreacted starting polyol can be removed from the reaction product under essentially non-reacting conditions. The percent by weight is based on the weight of the unreacted starting polyol. By non-reacting conditions herein is meant the conditions under which the unreacted polyol is removed by, say, distillation wherein further reactions are minimized. In most instances, the non-reacting conditions would be a function of temperature, pressure, catalyst level, nature of the polyurethane polyol and the unreacted polyol in question and the like.

Illustratively, it is preferred that the temperature at which the unreacted starting polyol is removed be lower than the temperature at which the polyurethane polyol is prepared. It is also preferred that catalysts for the preparation of the polyurethane polyol be employed at low levels. Alternately, if the catalyst is present at high levels, it should be removed or neutralized before the removal of the unreacted starting polyol. As would be realized, relatively higher temperatures or levels of catalyst would render the polyurethane polyol more susceptible to further reaction.

The following is a description of the reactants useful herein and the processing thereof to obtain the polyurethane polyol and compositions of this invention. The starting polyols are low molecular weight simple polyols which are distinguishable from polymeric polyols. They can be cyclic or acyclic or mixtures thereof. The term "starting polyols" as used herein denotes one or more of the polyols in admixture.

Examples of the cyclic polyols are 1,4-cyclohexanediol and 1,4-cyclohexanedimethanol. Examples of the acyclic polyols are those containing, preferably, from about 2 to 14, more preferably 3 to 10, and most preferably 3 to 6 carbon atoms. Examples of the acyclic polyols are ethylene glycol, propylene glycol, diethylene glycol, 1,4-butanediol, neopentyl glycol, 1,6-hexanediol, trimethylpentanediol and dipropylene glycol. The use of low molecular weight diols or glycols is preferred herein. Higher functionality polyols such as triols, while not preferred, can be used, preferably in admixture with the diols. An example of the higher functional polyol is trimethylolpropane.

The polyisocyanate useful herein can be an aliphatic, alicyclic, or an aromatic polyisocyanate or a mixtaure thereof. Diisocyanates are preferred, although higher functional polyisocyanates such as triisocyanates can be used, preferably in admixture with the diisocyanates. However, their use does result in some chain branching which results in increased viscosity and difficulties in formulating the high solids compositions of the invention. Examples of suitable diisocyanates are 4,4'-diphenylmethane diisocyanate, 1,4-tetramethylene diisocyanate, isophorone diisocyanate, trimethylhexamethylene diisocyanate, tetramethylxylene diisocyanate, 1,6-hexamethylene diisocyanate, and 4,4'-methylene-bis-(cyclohexyl isocyanate). Examples of suitable higher functionality polyisocyanates are polymethylene polyphenyl isocyanates, the isocyanurate from isophorone isocyanate, available from Veba Company as T1890, the biuret from 1,6-hexamethylene diisocyanate, available from Mobay Chemical Company as DESMODUR N.

In the process of preparing the instant polyurethane polyol, the starting polyol is reacted with a polyisocyanate. Typically, the urethane-forming reaction is conducted over a temperature range of 80° to 110° C. and is carried to completion or near completion. If necessary, the reaction can be terminated before completion. The unreacted isocyanate groups can be removed from the reaction product preferably by chemical means. In accordance with this invention, the reaction product comprises a polyurethane polyol and an unreacted starting polyol. If desired, the polyurethane polyol can be subjected to "typical polyol" reactions with, say, an acid, isocyanate, lactone, and the like.

The ratios of reactants in accordance with this invention are such as would yield a reaction product containing a significant amount, i.e., about 5 percent or higher, typically about 10 percent, preferably about 15 percent and more preferably about 30 percent or higher of unreacted starting polyol. The particular ratios of reactants depend on the nature of the reactants, the desired molecular weight and/or molecular weight distribution, the extent of the reaction and the like. Generally stated, where the reaction is to be carried to completion or near completion, a large excess of the starting polyol over the polyisocyanate is employed. Where the reaction is not carried to completion or near completion, relatively less of an excess of the polyol over the polyisocyanates can be employed.

Illustratively, to obtain polyurethane polyols containing a "significant amount" of unreacted starting polyols, i.e., about 5 percent, preferably 15 percent and more preferably 30 percent or higher, a starting diol and a diisocyanate are reacted in mole ratios of 1.5 to 15:1 and preferably 2.0 to 4:1, wherein the reaction is carried essentially to completion.

To obtain polyurethane polyols containing a "significantly high" amount of unreacted starting polyol, i.e., about 16 percent and preferably about 21 percent or higher, a starting diol and a diisocyanate are employed in mole ratios of 2.3 to 15:1 and preferably 2.3 to 4:1; wherein the reaction is carried essentially to completion.

The following is a description of a process for removing the unreacted starting polyol. Removal of the unreacted polyol is typically effected by means such as a distillation process. This process is generally known in the art. It entails removing the unreacted polyol from the reaction product by vaporization and condensation. Typically, the distillation is conducted at reduced pressures and at temperatures below the atmospheric boiling point of the reaction mixture.

Illustratively, a diol which has a low boiling point and which does not crystallize at room temperature can be removed as follows. A reaction product comprising same is heated to a pot temperature of about 100° C. and the distillation apparatus is depressurized below atmospheric pressure to about 300 to 0.01 torr. After the depressurization, heating of the pot is continued until the required amount of glycol is removed. Typically, heating is conducted over a pot temperature of 100° to 150° C. Higher temperature ranges can be employed if there is no further reaction of the resinous polyol. To facilitate the removal of the glycol, there may be introduced in the heating vessel a carrying means for the unreacted diol.

An unreacted diol which crystallizes at room temperature can be removed by employing a relatively high absolute reduced pressure of about 100 torr, a pot temperature of 150° C., using a condenser coolant at a temperature which will effect condensation of the diol. Said temperature is typically above the melting point of the unreacted diol in the distillation apparatus.

It is of interest that GPC of the resultant product, after unreacted polyol is removed, does not show the expected statistical distribution. In essence, the aspect of the distribution that would otherwise be ascribed to the unreacted polyol is absent from the GPC. The resultant polyurethane polyols with unreacted starting polyols removed have a number average molecular weight of up to about 1000 and preferably from about 200 to 600. The hydroxyl value is at least about 100 and preferably from about 150 to 500. The solids content can be from 85 to 100 percent and preferably from 95 to 100 percent. Wherein the unreacted starting polyols are not removed, the hydroxyl values would be higher and the solids content would be lower. Preferably, the hydroxyl value is greater than or equal to 500.

In measuring the molecular weight using glycols as the standard, a Waters Associate gel permeation chromatograph was used. One Varian Micro Pak TSK 1000H exclusion column available from Varian Instrument Group, Walnut Creek, Calif., U.S.A., was used. This column has the dimensions of 50 centimeters long and 7.5 millimeters inside diameter. A differential refractometer was used as detector. Tetrahydrofuran was used as a solvent with a flow rate of 1.0 milliliters/minute. The quality of the column is checked by its "theoretical plate number" determined from ortho-dichlorobenzene and the column with theoretical plate number greater than 8000/50 cm was used.

To determine molecular weight by gel permeation chromatography (GPC), the instrument is first calibrated using glycol standards. Glycol standards were purchased from Polymer Laboratories Ltd., Church Stretton, U.K. The weight average molecular weights of the glycol standards used were 998, 425 and 76 for polyethylene glycol, polyethylene glycol and propylene glycol, respectively. To obtain a calibration curve, a set of 2 percent by volume glycol solutions in tetrahydrofuran were prepared and a 75 microliters sample size was injected into the column and a GPC chromatogram was obtained. A linear least square fit of $\log_{10}$ (molecular weight) versus elution time of each standard was used as a calibration curve. The samples whose molecular weights are to be determined was prepared as a 1.0 percent per volume tetrahydrofuran solution. After filtration through a 0.5 micron filter, available from Gelman Corporation, Catalog No. 4219, a 75 microliters samples size was injected into the columns and a GPC chromatogram obtained under the same experimental conditions as the calibration. The chromatogram was divided into vertical segments of equal elution volume of approximately one milliliter and the height of each segment (Hi) and the corresponding molecular weight (Mi) obtained from the calibration curve were used to calculate the number average molecular weight (Mn) according to the equation:

$$Mn = \sum_{i=1}^{i} Hi / \sum_{i=1}^{i} (Hi/Mi)$$

The weight average molecular weight (Mw) is calculated according to the equations:

$$Mw = \Sigma HiMi/\Sigma Hi$$

The molecular weight distribution or polydispersity (Pd) is calculated according to the equation:

$$Pd = \overline{Mw}/\overline{Mn}$$

In the practice of the invention, the polyurethane polyols, or the modified forms thereof, can be employed in combination with a curing agent which is capable of reacting with the active hydrogens in the former so as to give thermosetting compositions. Examples of the curing agent are aminoplasts and blocked or unblocked isocyanates. Usually, a cure catalyst is employed therewith.

Aminoplast condensates are obtained from the reaction of formaldehyde with an amine or an amide. The most common and preferred amines or amides are melamine, urea or benzoguanamine. However, condensates with other amines and amides can be employed, for example, aldehyde condensates of diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5triazine and the like.

While the aldehyde employed is most often formaldehyde, other aldehydes such as acetaldehyde, crotonaldehyde, benzaldehyde and furfuraldehyde may be used.

The aminoplast contains methylol or similar alkylol groups and preferably at least a portion, and more preferably all, of these alkylol groups are etherified by reaction with an alcohol to provide organic solvent-soluble resins. Any monohydric alcohol can be employed for this purpose including such alcohols as methanol, ethanol, butanol and hexanol. The cure catalysts usually employed are dodecylbenzene sulfonic acid, para-toluene sulfonic acid and butylstannoic acid.

Preferably, the aminoplasts which are used as melamine-, urea- or benzoguanamine-formaldehyde condensates etherified with an alcholol containing 1 to 4 carbon atoms such as methanol, ethanol, butanol or mixtures thereof.

Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commerically available from Mobay Chemical Company as DESMODUR N. The polyisocyanate can be blocked with suitable blocking agents which would unblock at elevated temperatures such as low aliphatic alcohols such as methanol, oximes such as methyl ethyl ketone oxime, and lactams such as caprolactam.

The amounts of resinous polyol or the modified form thereof and curing agent which are used in the practice of the invention are preferably adjusted so that the weight ratio of the resinous polyol:curing agent is within the range of 6 to 0.5:1, preferably 3 to 1:1.

The above-described resinous components can be formulated into clear coating compositions or, alternately, they can be formulated with pigments to form paints. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as the pigment-to-resin weight ratio. In the practice of the invention, when the film-forming coating compositions of the present invention contain pigment, the pigment-to-resin weight ratios may be as high as 2:1 and for most pigmented coatings, are within the range of 0.05 to 1:1.

Although the coating compositions of the present invention can be of the high solids type, a liquid diluent is usually present in the composition. By liquid diluent is meant a solvent or non-solvent which is volatile and is removed after the coating is applied and is needed to reduce viscosity sufficiently to enable one, by simple coating techniques, namely, spraying, to spread the coating to controllable, desired and uniform thicknesses. Also, diluents assist in substrate wetting, resinous component compatibility, package stability and film formation. Examples of suitable diluents include aromatic hydrocarbons such as toluene and xylene, ketones such as methyl ethyl ketone and methyl isobutyl ketone, alcohols such as isopropyl alcohol, normal-butyl alcohol, monoethers of glycols such as the monoethers of ethylene glycol and diethylene glycol, monoether glycol acetates such as 2-ethoxyethyl acetate, as well as compatible mixtures thereof. The diluent is present in amounts of up to 60 percent by weight, usually 35 to 55 percent by weight, based on total weight of diluent and resin solids.

In addition to the above ingredients, various fillers, plasticizers, anti-oxidants, U.V. light absorbers, flow control agents, surfactants, and other formulating additives can be employed if desired. These materials are optional and generally constitute up to about 20 percent by weight, based on total solids in the coating formulation.

For coating compositions, the use of polymeric microparticles such as described in U.S. Pat. No. 4,147,688 is preferred for sag control and metallic pigment pattern control. The polymeric microparticles help to align metallic pigments such that they give the coating a lustrous appearance.

The coating compositions of the present invention are designed for application by spraying, although other conventional methods of coating include brushing, dipping and flow coating can be employed if desired. However, as mentioned above, they are especially formulated for spraying. Usual spray techniques and equipment are utilized. Coatings of the present invention can be applied virtually over any substrate including wood, metal, glass, cloth, plastics, foams and the like, as well as over various primers. The coatings can be useful on resilient and rubbery substrates, elastomeric parts, plastics, or on metal surfaces such as steel and aluminum.

The following examples further illustrate the invention.

EXAMPLE 1

Part 1

This example illustrates the high solids compositions comprising a polyurethane polyol of the present invention, and the method of preparing same. The polyurethane polyol was prepared, as follows:

| Ingredients | Parts by Weight (grams) | Moles |
|---|---|---|
| Neopentyl glycol | 1208 | 11.6 |
| 1,6-Hexanediol | 1371 | 11.6 |
| Trimethylhexamethylene diisocyanate | 1220 | 5.8 |
| Dibutyltin dilaurate | 0.38 | |

The above ingredients were charged to a 5-liter 4-necked flask equipped with a condenser, stirrer, thermometer and nitrogen inlet tube. The resultant mixture was heated to react in a nitrogen atmosphere to 60° C. There resulted an exotherm with the reaction temperature rising to 130° C. After about 15 minutes, the temperature dropped to 115° C. Infrared analysis of the reaction product at this point indicated that the isocyanate group has been consumed. The reaction product was allowed to cool, discharged and analyzed. The determined solids content was 62.3 percent, estimated unreacted starting polyol based on solids content was 37.7, hydroxyl value was 503, Mn was 698, Mw was 754 and Mw/Mn was 1.081.

Part 2

Unreacted starting polyol was removed from the above reaction product comprising a polyurethane polyol by vacuum distillation.

The distillation apparatus used herein comprised of a vessel (or pot), a condenser(s), a receiver(s) and a vacuum source, as described more fully below.

The Distillation Apparatus

The vessel comprised of a 4-neck flask equipped with a stirrer addition funnel, a thermometer for measuring pot temperatures and a (CLAISEN type) adaptor. The adaptor was connected to a condenser (FRIEDRICH type, herein referred to as Condenser 1). The adaptor was equipped with two thermometers for measuring head temperatures at point (A) closer to the pot and point (B) closer to Condenser 1.

As a condensing means for glycol-rich vapors, water at room temperatue or higher temperatures or steam was used in Condenser 1. A receiver which was a 3-neck flask (herein referred to as Receiver 1) was attached to the Condenser 1. By means of a U-shaped connecting adaptor, Receiver 1 was connected in series to another receiver which was also a 3-neck flask (herein referred to as Receiver 2). Receiver 2 was connected to another condenser (ALLIHN type, herein referred to as Condenser 2). As a condensing means for water-rich vapors, water at ambient temperature was used in Condenser 2. To this condenser was attached yet another condenser (DEAN type) which functioned as a trap for materials that might lead into a vacuum source attached thereto.

The Distillation Process 3800 grams of the reaction product of Part 1 was charged to the flask of the apparatus described herein. The contents of the flask were heated and the system was placed under vacuum. At a pot temperature of 122° C., applied reduced pressure was 50 mm. At a pot temperature of 160° C., and a reduced pressure of 45 torr, water was introduced into the system via a dropping funnel. At this stage, the head temperature at (A) was 30° C., the head temperature at (B) was 24° C., and Condenser 1 was at 35° C. The head temperature at (A) and (B) soon rose to 150° C. and 120° C., respectively. Distillate began to condense and was collected in Receivers 1 and 2.

The reaction mixture was heated to 176° C. The head temperatures at (A) and (B) were 164° C. and 158° C., respectively. Water was added at a drop rate of 48 drops per minute, and the distillate came off at a drop rate of 260 drops per minute. The reaction temperature was maintained at 180° C. for about 3 hours. Thereafter, the head temperatures at (A) and (B) had fallen to 135° C. and 90° C., respectively. At the end of the distillation process, the amount of distillate collected in Receiver 1 and Receiver 2 were 1657 and 549, respectively. A total of 640 milliliters of water had been added. The reaction product remaining in the pot was thinned to 80 percent solids with methyl isobutyl ketone. Analysis gave a determined solids of 79.8 percent, a viscosity of 16.55 stokes, hydroxyl value of 155; Mn was 705, Mw was 781 and Mw/Mn was 1.11. Estimated unreacted starting glycol based on solids content was 0.25 percent.

EXAMPLE 2

Part 1

A polyurethane polyol was prepared, in essentially the same manner as described in Example 1, part 1. The following were used in the preparation.

| Ingredients | Parts by Weight (grams) | Moles |
| --- | --- | --- |
| Trimethylhexamethylene diisocyanate | 1170 | 5.6 |
| 1,6-Hexanediol | 2630 | 22.3 |
| Dibutyltin dilaurate | 0.38 | |

The reaction product had a determined solids content of 62.8 percent, hydroxyl value of 458, Mn was 760, Mw was 818 and Mw/Mn was 1.076.

Part 2

Unreacted 1,6-hexanediol was removed from the above reaction product by vacuum distillation in essentially the same manner as described in Example 1 and summarized hereinbelow.

3800 grams of the reaction product were charged to a properly equipped reaction vessel, heated and a vacuum was applied. At a pot temperature of 160° C., head temperature of 30° C. and 24° C., and applied reduced vacuum pressure of 45 torr, addition of water into the reaction pot was started and distillation began. Heating was continued to 180° C. and introduction of water was continued and distillate was collected. The distillation was terminated after 640 grams of water had been introduced into the vessel.

Weight of the distillate was 2206 grams. 2013 grams of the polyurethane polyol in the vessel were trimmed with 503 grams methyl isobutyl ketone and analyzed. Analysis: Determined resin solids content was 79.8 percent, viscosity was 16.5 stokes, hydroxyl value was 155; Mn was 764, Mw was 837 and Mw/Mn was 1.10.

EXAMPLE 3

This example shows the use of the polyurethane polyol in imparting hardness properties to coating compositions.

A coating composition comprising a polyester-urethane polyol was prepared as follows:

Part 1

A polyester polyol was prepared, as follows:

| Ingredients | Parts by Weight (grams) | Moles |
| --- | --- | --- |
| Hexahydrophthalic anhydride | 7165.2 | 46.5 |
| 1,6-Hexanediol | 5493 | 46.6 |
| Neopentyl glycol | 4841.6 | 46.6 |

The above ingredients were charged to a properly equipped reaction vessel and the resultant mixture heated to react in a nitrogen atmosphere. At 170° C., there resulted the production of water of (esterification) reaction. With the continuous removal of the water, heating was continued to 200° C. The reaction mixture was then held at 200° C., for about 12 hours until an acid value of about 10.0 was attained. The resultant mixture was then cooled, discharged and analyzed.

Analysis: Viscosity was 61.8 stokes, acid value was 10.8 and hydroxyl value was 306.8.

Part 2

A polyester-urethane polyol was prepared with the above polyester polyol.

| Ingredients | Parts by Weight (grams) | Equivalents |
| --- | --- | --- |
| The polyester polyol (as described above) | 2700 | 15.08 |
| Trimethylhexamethylene diisocyanate | 476.5 | 4.53 |
| Triphenylphosphite | 1.6 | |
| Methylisobutyl ketone | 353 | |
| dibutyltin dilaurate | 0.32 | |

The above ingredients were charged to a properly equipped reaction vessel as described in Example 1 and the resultant mixture heated to react in a nitrogen atmosphere to a temperature of 90° C. The reaction mixture was held at this temperature for about 2 hours until all the isocyanate had reacted. The resultant composition was discharged and analyzed.

Analysis: Determined solids content was 84.4 percent, acid value was 8.0 and hydroxyl value was 168.

Part 3 (Control)

A coating composition was formulated with a polyester-urethane polyol of the same composition as the above. The polyester-urethane polyol was formulated with an aminoplast curing agent and other ingredients as listed below.

| Ingredients | Parts by Weight (grams) | Resin Solids |
| --- | --- | --- |
| The above polyester-urethane polyol | 88.9 | 80 |
| Melamine[1] | 20 | 20 |
| Polymeric microparticles[2] | 5.1 | 2.25 |
| Cellulose acetate butyrate | 3 | 0.75 |
| U.V. absorber[3] | 2 | 2 |
| Flow control agent | 0.5 | 0.25 |
| U.V. stabilizer[4] | 2 | 1 |
| Dodecylbenzene sulfonic acid | 2 | 0.4 |
| Thinning solvent[5] | 60.5 | |

[1]RESIMINE 745 available from Monsanto Company.
[2]Prepared as described in Example II of U.S. Pat. No. 4,147,688.
[3]Available from Ciba-Geigy Company as TINUVIN.
[4]Available from Ciga-Geigy Company as TINUVIN.
[5]Isobutyl acetate/cellosolve acetate, in a 1:1 ratio.

The coating composition having a sprayable resin solids content of 57 percent by weight was sprayed on a ⅛-inch thick thermoplastic polyurethane commercially available from Mobay as TEXIN 355D. The coating was baked at 121° C. for 30 minutes and then subjected to flexibility tests comprising a ¼-inch mandrel bend at 20° F. (−7° C.) and Tuckon hardness test.

The substrate passed the flexibility test in that it withstood ¼-inch mandrel test at room temperature without a substantial break or crack. The substrate showed an acceptable hardness rating of 7.4 Tuckon.

Part 4

To improve the hardness while maintaining the flexibility of the above coating composition, it was reformulated with the above ingredients and a polyurethane polyol of Example 1.

| Ingredients | Parts by Weight (grams) | Resin Solids |
| --- | --- | --- |
| The above polyester-urethane polyol | 77.5 | 70 |
| The polyurethane polyol of Example 1 | 12.5 | 10 |
| Melamine[1] | 20 | 20 |
| Polymeric microparticles[2] | 5.1 | 2.25 |
| Cellulose acetate butyrate | 3 | 0.75 |
| U.V. absorber[3] | 2 | 2 |
| Flow control agent | 0.5 | 0.25 |
| U.V. stabilizer[4] | 2 | 1 |
| Dodecylbenzene sulfonic acid | 2 | 0.4 |
| Thinning solvent[5] | 60.5 | |

[1]RESIMINE 745 available from Monsanto Company.
[2]Prepared as described in Example II of U.S. Pat. No. 4,147,688.
[3]Available from Ciba-Geigy Company as TINUVIN.
[4]Available from Ciga-Geigy Company as TINUVIN.
[5]Isobutyl acetate/cellosolve acetate, in a 1:1 ratio.

The coating composition having a sprayable resin solids content of 57 percent by weight was sprayed on a ⅛-inch thick thermoplastic polyurethane commercially available from Mobay as TEXIN 355D. The coating was baked at 121° C. for 30 minutes and then subjected to flexibility and hardness tests as before.

The substrate passed the flexibility test in that it withstood ¼-inch mandrel test at room temperature without a substantial break or crack, and displayed Tuckon hardness of 10.1.

What is claimed is:

1. A polyurethane polyol having a number average molecular weight of up to about 1000 which is prepared by reacting a low molecular weight starting polyol with a polyisocyanate, wherein the starting polyol is in an amount sufficient to produce a reaction product containing about 5 percent or higher unreacted starting polyol.

2. A polyurethane polyol having an average number molecular wweight of up to about 1000 which is prepared by reacting:
   (a) a glycol with
   (b) a diisocyanate; the mole ratio of the glycol to the diisocyanate is about 1.5 to 15:1, wherein the reaction is carried essentially to completion.

3. A polyurethane polyol of claim 2, wherein the mole ratio is 1.7 to 4:1.

4. A polyurethane polyol of claim 2, wherein the diol is selected from the group consisting of diethylene glycol, neopentyl glycol, 1,6-hexanediol, trimethylpentanediol, 1,4-cyclohexanediol and 1,4-cyclohexanedimethanol, or a mixture thereof.

5. A polyurethane polyol of claim 2, wherein the diisocyanate is selected from the group consisting of trimethylhexamethylene diisocyanate, isophorone diisocyanate, and 4,4'-methylene-bis-cyclohexyl isocyanate.

6. A polyurethane polyol having a number average molecular weight of up to about 1000 which is prepared by:
   (1) reacting a low molecular weight starting polyol with a polyisocyanate, wherein the starting polyol is in an amount sufficient to produce a reaction product containing about 5 percent or higher of unreacted starting polyol; said reaction is followed by
   (2) removing about 30 percent or higher of the unreacted starting polyol, under essentially non-reacting conditions.

7. A polyurethane polyol of claim 6, wherein the reaction product of (1) contains about 15 percent of unreacted starting polyol.

8. A polyurethane polyol of claim 7, wherein the reaction product of (1) contains about 30 percent of unreacted starting polyol.

9. A polyurethane polyol having an average number molecular weight of up to about 1000 which is prepared by:
(1) reacting:
(a) a glycol with
(b) a diisocyanate;
wherein the glycol is in an amount sufficient to produce a reaction product containing about 5 percent of higher unreacted glycol; followed by
(2) removing about 30 percent or higher of the unreacted glycol, under essentially non-reacting conditions.

10. A polyurethane polyol of claim 9, wherein the glycol is reacted in a mole ratio of about 1.5 to 15:1, wherein the reaction is carried to completion.

11. A polyurethane polyol of claim 10, wherein the mole ratio is about 2 to 4:1.

12. A polyurethane of claim 9, wherein the glycol is selected from the group consisting of diethylene glycol, neopentyl glycol, 1,6-hexanediol, trimethylpentanediol, 1,4-cyclohexanediol and 1,4-cyclohexanedimethanol, or a mixture thereof.

13. A polyurethane of claim 9, wherein the diisocyanate is selected from the group consisting of trimethylhexamethylene diisocyanate, isophorone diisocyanate, and 4,4'-methylene-bis-cyclohexyl isocyanate.

14. A polyurethane of claim 9, having a resin solids content of 85 to 100.

15. A polyurethane of claim 14, having a resin solids content of 95 to 100.

16. A coating composition comprising the polyurethane polyol of claim 1.

17. A high solids thermosetting coating composition having a sprayability of at least 40 percent which comprises a curing agent and the high solids composition of claim 6.

18. A high solids thermosetting coating composition having a sprayability of at least 40 percent which comprises a curing agent and the high solids composition of claim 9.

19. A high solids thermosetting coating composition of claim 17, wherein the curing agent is a melamine or an isocyanate.

20. A high solids thermosetting coating composition of claim 18, wherein the curing agent is a melamine or an isocyanate.

* * * * *